United States Patent
Jaladanki

(10) Patent No.: US 9,536,250 B2
(45) Date of Patent: Jan. 3, 2017

(54) BLENDING ADVERTISER DATA WITH AD NETWORK DATA IN ORDER TO SERVE FINELY TARGETED ADS

(75) Inventor: Sreenivasulu Jaladanki, Cupertino, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 462 days.

(21) Appl. No.: 12/973,696

(22) Filed: Dec. 20, 2010

(65) Prior Publication Data

US 2012/0158505 A1    Jun. 21, 2012

(51) Int. Cl.
*G06Q 30/00* (2012.01)
*G06Q 30/02* (2012.01)

(52) U.S. Cl.
CPC ...... *G06Q 30/0251* (2013.01); *G06Q 30/0255* (2013.01); *G06Q 30/0269* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,838,790 A * | 11/1998 | McAuliffe | ............ | H04L 63/123 705/77 |
| 7,853,700 B2 * | 12/2010 | Lee | ............ | G06Q 30/02 705/7.29 |
| 7,949,563 B2 * | 5/2011 | Collins | ............ | G06Q 10/0631 705/14.42 |
| 8,108,895 B2 * | 1/2012 | Anderson | ............ | G06Q 30/02 705/14.4 |
| 2001/0029465 A1 * | 10/2001 | Strisower | ............ | G06F 3/0481 705/14.49 |
| 2001/0032115 A1 * | 10/2001 | Goldstein | ............ | G06Q 30/02 705/7.32 |
| 2002/0120506 A1 * | 8/2002 | Hagen | ............ | G06Q 30/02 705/14.41 |
| 2002/0165774 A1 * | 11/2002 | Quinn | ............ | G06F 17/30867 705/14.55 |
| 2003/0009392 A1 * | 1/2003 | Perkowski | ............ | G06F 17/30879 705/14.51 |
| 2003/0158789 A1 * | 8/2003 | Miura | ............ | G06Q 30/02 705/14.61 |
| 2004/0068435 A1 * | 4/2004 | Braunzell | ............ | G06Q 30/02 705/14.42 |
| 2005/0177431 A1 * | 8/2005 | Willis | ............ | G06Q 30/02 705/14.66 |

(Continued)

Primary Examiner — Matthew T Sittner
(74) Attorney, Agent, or Firm — Brinks Gilson & Lione

(57) ABSTRACT

A method and a system are provided for blending advertiser data with ad network data in order to serve finely targeted ads. In one example, the system receives campaign information from one or more advertisers. The campaign information includes at least one of a budget, criteria, and a creative. The system receives a notification from a user device about an available ad spot on a webpage for display at a browser running on the user device. The system receives data from an advertiser. The data from the advertiser pertains to managing an ad to be sent to the user device to fill the ad spot on the webpage. Then, the system combines the data from the advertiser with data from an ad network to obtain combined data. The ad network is configured for managing at least part of an ad campaign. The advertiser is also configured for managing at least part of the ad campaign.

20 Claims, 8 Drawing Sheets

(56) References Cited

U.S. PATENT DOCUMENTS

| | | | |
|---|---|---|---|
| 2005/0197164 A1* | 9/2005 | Chan | G06Q 30/02 455/566 |
| 2005/0251448 A1* | 11/2005 | Gropper | G06Q 10/1093 705/14.61 |
| 2006/0041480 A1* | 2/2006 | Briggs | G06Q 30/02 705/14.41 |
| 2006/0074752 A1* | 4/2006 | Newmark | G06Q 30/02 705/14.46 |
| 2006/0143084 A1* | 6/2006 | Donnelli | G06Q 30/02 705/14.49 |
| 2006/0200377 A1* | 9/2006 | Wolfe | G06Q 30/02 705/14.54 |
| 2006/0288100 A1* | 12/2006 | Carson | G06F 17/30864 709/224 |
| 2006/0293951 A1* | 12/2006 | Patel | G06Q 30/02 705/14.1 |
| 2007/0027865 A1* | 2/2007 | Bartz | G06F 17/2785 |
| 2007/0105536 A1* | 5/2007 | Tingo | G06Q 30/02 455/414.1 |
| 2007/0162395 A1* | 7/2007 | Ben-Yaacov | G06F 17/30017 705/51 |
| 2008/0004956 A1* | 1/2008 | Atherton | G06Q 10/067 705/14.72 |
| 2008/0097832 A1* | 4/2008 | Lee | G06Q 30/02 705/7.29 |
| 2008/0189181 A1* | 8/2008 | Zorman | G06Q 30/02 705/14.71 |
| 2008/0249876 A1* | 10/2008 | Rice | G06Q 30/0212 705/14.14 |
| 2008/0255915 A1* | 10/2008 | Collins | G06Q 10/0631 705/7.12 |
| 2008/0262928 A1* | 10/2008 | Michaelis | G06Q 30/02 705/14.26 |
| 2009/0044216 A1* | 2/2009 | McNicoll | G11B 27/105 725/5 |
| 2009/0106100 A1* | 4/2009 | Mashinsky | G06Q 10/0637 705/14.1 |
| 2009/0132359 A1* | 5/2009 | Borshack | G06F 17/30893 705/14.52 |
| 2009/0132363 A1* | 5/2009 | Powell | G06Q 30/0273 705/14.69 |
| 2009/0177542 A1* | 7/2009 | Haberman | G06F 17/30017 705/14.1 |
| 2009/0198684 A1* | 8/2009 | Collins | G06F 17/30731 |
| 2009/0216642 A1* | 8/2009 | Ho | G06Q 30/02 705/14.25 |
| 2009/0222316 A1* | 9/2009 | Boinepalli | G06Q 10/00 705/7.33 |
| 2009/0254420 A1* | 10/2009 | Curd | G06Q 30/02 705/7.29 |
| 2009/0259552 A1* | 10/2009 | Chenard | G06Q 30/02 705/14.72 |
| 2009/0265243 A1* | 10/2009 | Karassner | G06Q 30/02 705/14.54 |
| 2009/0300490 A1* | 12/2009 | Lejano | G06F 17/212 715/277 |
| 2009/0307085 A1* | 12/2009 | Lejano | G06Q 30/02 705/14.49 |
| 2010/0036719 A1* | 2/2010 | Eklund | G06Q 30/0241 705/14.4 |
| 2010/0036740 A1* | 2/2010 | Barashi | G06Q 30/02 705/14.71 |
| 2010/0135200 A1* | 6/2010 | Karaoguz | H04W 8/005 370/328 |
| 2010/0174605 A1* | 7/2010 | Dean | G06Q 30/02 705/14.49 |
| 2010/0185687 A1* | 7/2010 | Chung | G06Q 30/0272 707/803 |
| 2010/0217664 A1* | 8/2010 | Steelberg | G06Q 30/0244 705/14.43 |
| 2010/0241511 A1* | 9/2010 | Cunningham | G06Q 30/02 705/14.46 |
| 2010/0299205 A1* | 11/2010 | Erdmann | G06F 21/6263 705/14.54 |
| 2011/0015989 A1* | 1/2011 | Tidwell | G06Q 30/02 705/14.43 |
| 2011/0040617 A1* | 2/2011 | Moonka | G06Q 30/02 705/14.46 |
| 2011/0066497 A1* | 3/2011 | Gopinath | G06Q 30/02 705/14.53 |
| 2011/0119125 A1* | 5/2011 | Javangula | G06Q 30/02 705/14.43 |
| 2011/0119126 A1* | 5/2011 | Park | G06Q 30/02 705/14.45 |
| 2011/0126229 A1* | 5/2011 | Littlejohn | H04H 60/25 725/35 |
| 2011/0258056 A1* | 10/2011 | Ioffe | G06Q 30/02 705/14.73 |
| 2011/0270675 A1* | 11/2011 | Veach | G06Q 30/02 705/14.48 |
| 2011/0270686 A1* | 11/2011 | Patwa | G06Q 30/0269 705/14.66 |
| 2011/0295667 A1* | 12/2011 | Butler | G06Q 30/02 705/14.12 |
| 2011/0302031 A1* | 12/2011 | Chen | G06Q 30/0255 705/14.53 |
| 2012/0005029 A1* | 1/2012 | Lang | G06Q 30/0275 705/14.71 |
| 2012/0011003 A1* | 1/2012 | Ketchum | G06Q 30/0276 705/14.72 |
| 2012/0016695 A1* | 1/2012 | Bernard | G06Q 40/08 705/4 |
| 2012/0060184 A1* | 3/2012 | Nguyen | H04H 60/00 725/36 |
| 2012/0109727 A1* | 5/2012 | Ben-Yaacov | G06F 17/30017 705/14.4 |
| 2012/0109741 A1* | 5/2012 | Ballapragada | G06Q 30/0277 705/14.43 |
| 2012/0116896 A1* | 5/2012 | Holloway | H04L 63/1458 705/14.73 |
| 2012/0143713 A1* | 6/2012 | Dittus | G06Q 30/08 705/26.3 |
| 2012/0150626 A1* | 6/2012 | Zhang | G06Q 30/0243 705/14.42 |
| 2012/0150645 A1* | 6/2012 | Mandyam | G06Q 30/0256 705/14.54 |
| 2012/0209727 A1* | 8/2012 | Bennett | G06Q 30/0207 705/14.73 |
| 2012/0246177 A1* | 9/2012 | Perrow | G06F 17/30241 707/750 |

* cited by examiner

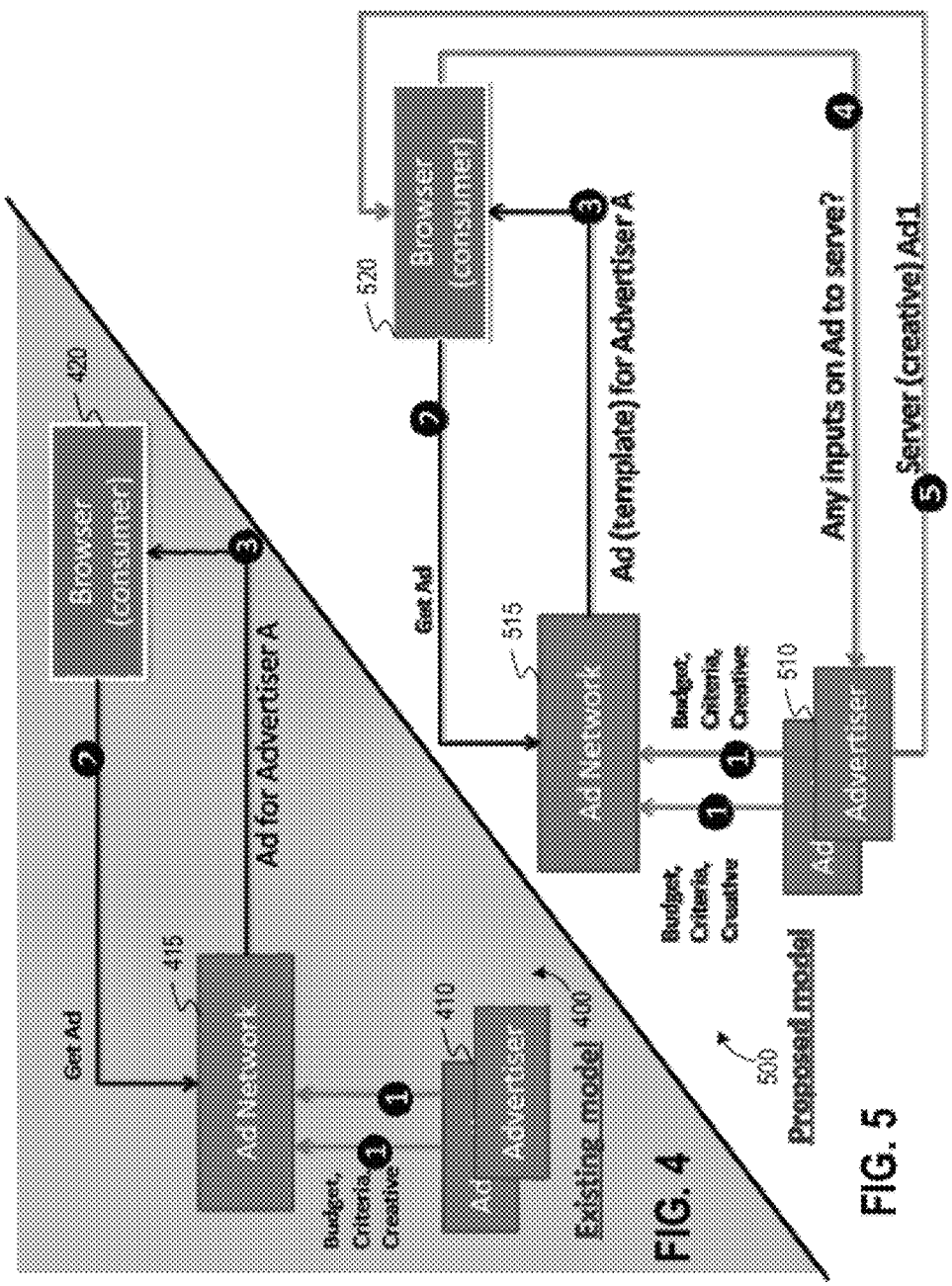

```
// Call back that Advertiser implements with their own logic
function tellMeWhatAdToServe(String campaignId) {
    if (document.cookie.length > 0) { // retrieve their (advertiser) own cookie
      var ca = document.cookie;
      var in = 0; // 0 is index of default Ad
      switch(ca) {
              case "a": in = 1; break;
              case "b": in = 2; break;
              case "x": in = 4; break;
              default:  in = 0; break;
      }
   }
      return in;
}
```

FIG. 7

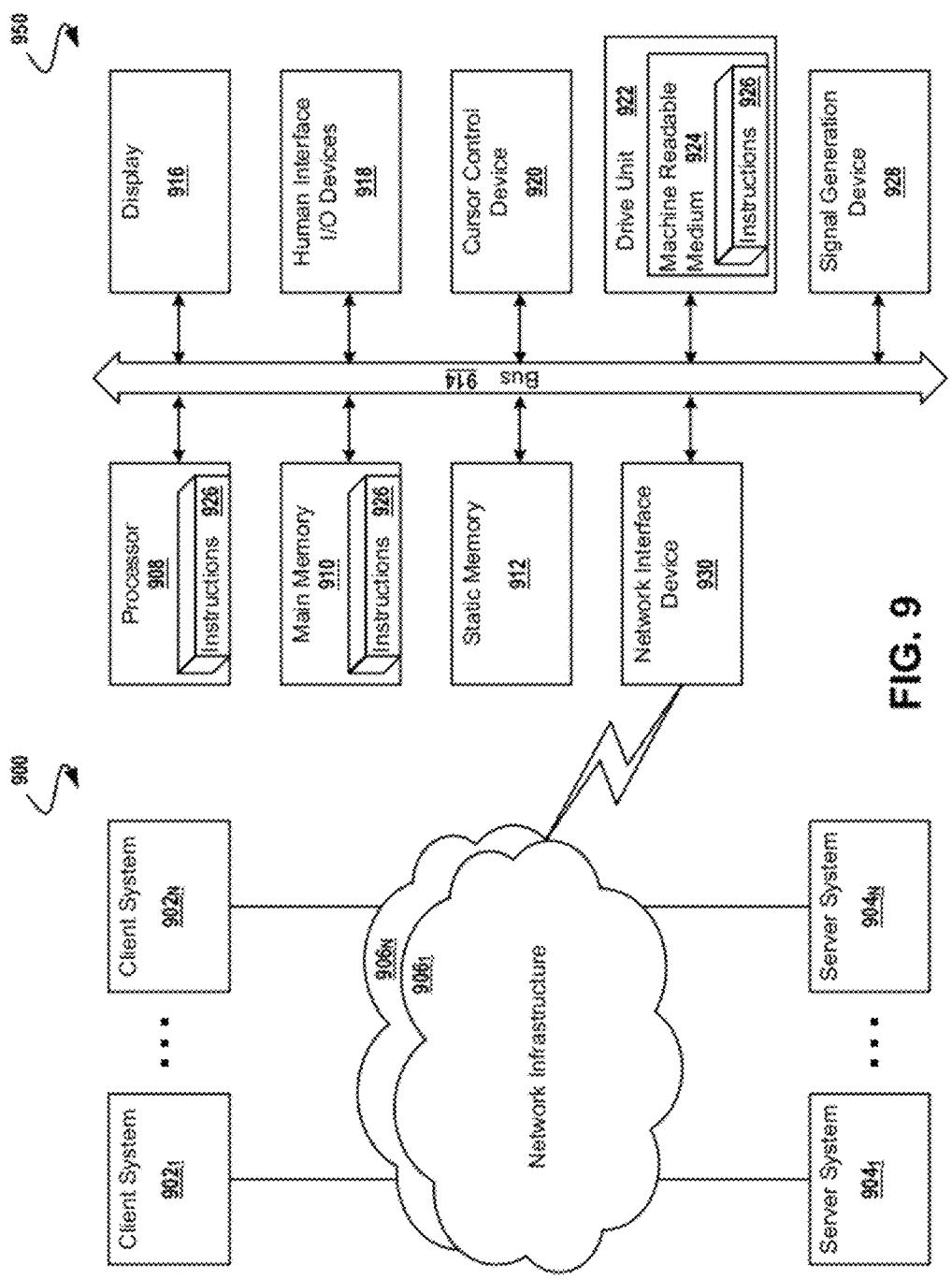

BLENDING ADVERTISER DATA WITH AD NETWORK DATA IN ORDER TO SERVE FINELY TARGETED ADS

FIELD OF THE INVENTION

The invention relates to online advertising. More particularly, the invention relates to blending advertiser data with ad network data in order to serve finely targeted ads.

BACKGROUND

An advertiser, such as Ford™ or McDonald's™, generally contracts a creative agency for ads to be placed in various media for the advertiser's products. Such media may include TV, radio, Internet ads (e.g., sponsored search ads, banner display ads, textual ads, streaming ads, mobile phone ads, etc.) or print medium ads (e.g., ads in newspapers, magazines, posters, etc.). The advertiser may engage one or more creative agencies that specialize in generating ads for one or more of the above media. A company wants to show the most relevant ads to end users in order to get the most value from their ad campaign.

It would be beneficial to use the data that the advertiser has in order to aim online ads at target consumers. Unfortunately, using data that advertisers have in targeted advertising involves complex ETL (extracting, transforming and loading), data sharing and tedious legal issues.

SUMMARY

What is needed is an improved method having features for addressing the problems mentioned above and new features not yet discussed. Broadly speaking, the invention fills these needs by providing a method and a system for blending advertiser data with ad network data in order to server finely targeted ads.

In a first embodiment, a computer-implemented method is provided for delivering targeted items (e.g., targeted ads). The method comprises the following: receiving, at a computer, campaign information from one or more messengers, wherein the campaign information includes at least one of a budget, criteria, and a creative; receiving, at a computer, a notification from a user device about an available item spot on a webpage for display at a browser running on the user device; receiving, at a computer, data from an outside entity, wherein the data from the outside entity pertains to managing an item to be sent to the user device to fill the item spot on the webpage; and combining, at a computer, the data from the outside entity with data from an inside entity to obtain combined data, wherein the inside entity is configured for managing at least part of an item campaign, and wherein the outside entity is also configured for managing at least part of the item campaign.

In a second embodiment, a system is provided for delivering targeted items (e.g., targeted ads). The system comprises a computer system configured for the following: receiving, at a computer, campaign information from one or more messengers, wherein the campaign information includes at least one of a budget, criteria, and a creative; receiving, at a computer, a notification from a user device about an available item spot on a webpage for display at a browser running on the user device; receiving, at a computer, data from an outside entity, wherein the data from the outside entity pertains to managing an item to be sent to the user device to fill the item spot on the webpage; and combining, at a computer, the data from the outside entity with data from an inside entity to obtain combined data, wherein the inside entity is configured for managing at least part of an item campaign, and wherein the outside entity is also configured for managing at least part of the item campaign.

In a third embodiment, a computer readable medium is provided comprising one or more instructions for delivering targeted items (e.g., targeted ads). The one or more instructions are configured for causing one or more processors to perform the following steps: receiving, at a computer, campaign information from one or more messengers, wherein the campaign information includes at least one of a budget, criteria, and a creative; receiving, at a computer, a notification from a user device about an available item spot on a webpage for display at a browser running on the user device; receiving, at a computer, data from an outside entity, wherein the data from the outside entity pertains to managing an item to be sent to the user device to fill the item spot on the webpage; and combining, at a computer, the data from the outside entity with data from an inside entity to obtain combined data, wherein the inside entity is configured for managing at least part of an item campaign, and wherein the outside entity is also configured for managing at least part of the item campaign.

The invention encompasses other embodiments configured as set forth above and with other features and alternatives. It should be appreciated that the invention may be implemented in numerous ways, including as a method, a process, an apparatus, a system or a device.

BRIEF DESCRIPTION OF THE DRAWINGS

The invention will be readily understood by the following detailed description in conjunction with the accompanying drawings. To facilitate this description, like reference numerals designate like structural elements.

FIG. 4 is a flow diagram of an existing method for combining consumer data for targeted advertising;

FIG. 5 is a high-level flow diagram of a proposed method for combining consumer data for targeted advertising, in accordance with some embodiments;

FIG. 7 is an example of a script that an Advertiser may implement to influence a decision pertaining to an ad displayed at an spot, in accordance with some embodiments;

FIG. 9 is a diagrammatic representation of a network, including nodes that may comprise a machine within which a set of instructions may be executed, in accordance with some embodiments.

DETAILED DESCRIPTION

Figure 1:
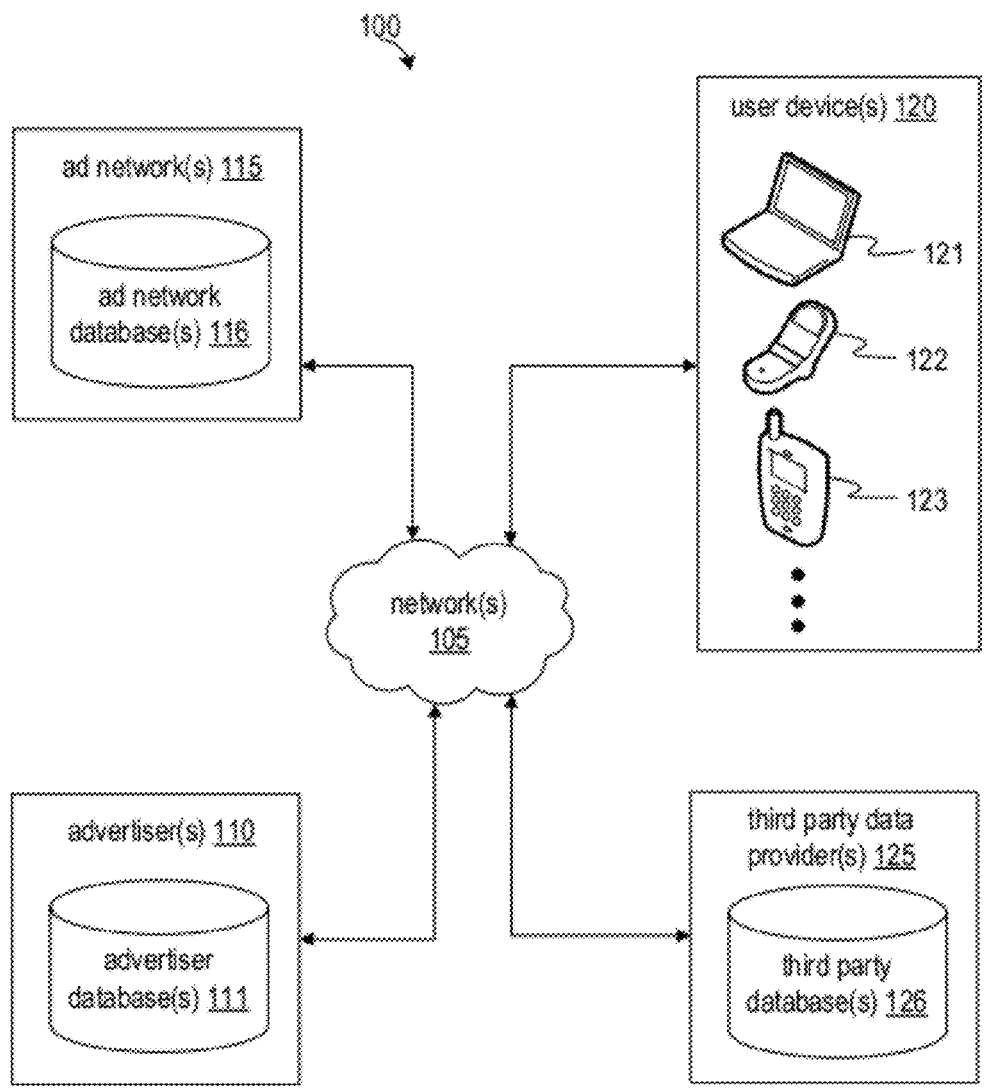
FIG. 1 is a high-level block diagram of a system for blending advertiser data with ad network data, in accordance with some embodiments.

An invention is disclosed for a method and a system for blending advertiser data with ad network data in order to server finely targeted ads. Numerous specific details are set forth in order to provide a thorough understanding of the invention. It will be understood, however, to one skilled in the art, that the invention may be practiced with other specific details.

Definitions

Some terms are defined below in alphabetical order for easy reference. These terms are not rigidly restricted to these definitions. A term may be further defined by the term's use in other sections of this description.

"Ad" (e.g., ad, item and/or message) means a paid announcement, as of goods or services for sale, preferably on a network, such as the Internet. An ad may also be referred to as an ad, creative, an item and/or a message.

"Ad server" is a server that is configured for serving one or more ads to user devices. An ad server is preferably controlled by a publisher of a Web site and/or an advertiser of online ads. A server is defined below.

"Advertiser" (e.g., messenger and/or messaging customer, etc.) means an entity that is in the business of marketing a product and/or a service to users that desires to send a message about the product and/or service. An advertiser may include, without limitation, a seller and/or a third-party agent for the seller. An advertiser also includes agents that represent advertisers for purposes of delivering online ads (See below). An advertiser may also be referred to as a messenger and/or a messaging customer. Advertising may also be referred to as messaging.

An "advertising network" or "ad network" refers to any entity that integrates other entities, such as advertisers and publishers, to deliver ads online. An advertising network typically operates in conjunction with advertisers and publishers in order to deliver ads, from one or more advertisers, to Web pages of one or more publishers. For example, Yahoo! Inc, the assignee of the present invention, operates such an advertising network.

"Advertising" means marketing a product and/or service to one or more potential consumers by using an ad. One example of advertising is publishing a sponsored search ad on a Web site.

An "agent" or "integrator network" generally defines an entity of an online advertising system that represents or integrates one or more entities on the advertising system (e.g., advertisers, publishers, advertising networks, etc.). For example, an integrator network may represent advertisers on the advertising system in order to deliver advertisements to publishers, advertising networks and other integrator networks.

"Application server" is a server that is configured for running one or more devices loaded on the application server. For example, an application server may run a device configured for deducing shadow profiles.

"Click" (e.g., ad click) means a selection of an ad impression by using a selection device, such as, for example, a computer mouse or a touch-sensitive display.

"Click-through rate", also known as CTR or ad clickthough rate, means a measurement of how many times users click on an ad per unit view. CTR preferably equals ad clicks per ad views.

"Client" means the client part of a client-server architecture. A client is typically a user device and/or an application that runs on a user device. A client typically relies on a server to perform some operations. For example, an email client is an application that enables a user to send and receive e-mail via an email server. The computer running such an email client may also be referred to as a client.

"Creative" means an ad, which is defined above.

"Database" (e.g., database system, etc.) means a collection of data organized in such a way that a computer program may quickly select desired pieces of the data. A database is an electronic filing system. In some instances, the term "database" is used as shorthand for "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include without limitation a software application such as Microsoft Word™, a laptop computer, a database, a server, a display, a computer mouse and/or a hard disk.

"Item" means an ad, which is defined above.

"Marketplace" means a world of commercial activity where products and/or services are browsed, bought and/or sold, etc. A marketplace may be located over a network, such as the Internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks, including without limitation the Internet, a local area network, a wide area network, a wireless network and a cellular network.

"Publisher" means an entity that publishes, on a network, a Web page having content and/or ads, etc.

"Script" means a list of commands that can be executed without user interaction. A script language is a simple programming language with which a programmer may write scripts. An example of a script language is JavaScript™, which is an implementation of the ECMAScript™ language standard and is typically used to enable programmatic access to computational objects within a host environment. A script written in JavaScript™ may simply be referred to as a JavaScript™.

"Server" means a software application that provides services to other computer programs (and their users), in the same computer or another computer. A server may also refer to the physical computer that has been set aside to run a specific server application. For example, when the software Apache HTTP Server is used as the Web server for a company's Web site, the computer running Apache may also be called the Web server. Server applications may be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User" (e.g., consumer, etc.) means an operator of a user device. A user is typically a person who seeks to acquire a product and/or service. For example, a user may be a woman who is browsing Yahoo!™ Shopping for a new cell phone to replace her current cell phone. The term "user" may refer to a user device, depending on the context.

"User device" (e.g., computer, user computer, client and/or server, etc.) means a single computer or to a network of interacting computers. A user device is a computer that a user may use to communicate with other devices over a network, such as the Internet. A user device is a combination of a hardware system, a software operating system and perhaps one or more software application programs. Examples of a user device include without limitation a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" (e.g., browser) means a software program that may display text, graphics, or both, from Web pages on Web sites. Examples of a Web browser include without limitation Mozilla Firefox™ and Microsoft Internet Explorer™.

"Web page" means documents written in a mark-up language including without limitation HTML (hypertext mark-up language), VRML (virtual reality modeling language), dynamic HTML, XML (extended mark-up language) and/or other related computer languages. A Web page may also refer to a collection of such documents reachable through one specific Internet address and/or through one specific Web site. A Web page may also refer to any document obtainable through a particular URL (Uniform Resource Locator).

"Web portal" (e.g., public portal) means a Web site or service that offers a broad array of resources and services, such as, for example, e-mail, forums, search engines, and online shopping malls. The first Web portals were online services, such as AOL, that provided access to the Web. However, now, most of the traditional search engines (e.g., Yahoo!™) have transformed themselves into Web portals to attract and keep a larger audience.

"Web server" is a server configured for serving at least one Web page to a Web browser. An example of a Web server is a Yahoo!™ Web server. A server is defined above.

"Web site" means one or more Web pages. A Web site preferably includes plurality of Web pages, virtually connected to form a coherent group.

General Overview

The system is configured for combining consumer data from advertisers (e.g., Walmart, Nike, etc.) with consumer data from an ad network (e.g., (e.g., Yahoo!™ Shopping, eBates™, eBay™, etc.) in order to server finely targeted ads. The system relieves the entities involved from having to deal with complex ETL (extracting, transforming and loading) and data sharing issues. This section provides an architectural overview of the system.

FIG. 1 is a high-level block diagram of a system 100 for blending advertiser data with ad network data, in accordance with some embodiments. The one or more networks 105 couple together entities, including without limitation one or more advertisers 110, one or more ad networks 115, one or more user devices 120, and one or more third party data providers 125. The network 105 may be any combination of networks, including without limitation the Internet, a local area network, a wide area network, a wireless network and/or a cellular network.

Each user device 120 includes without limitation a single computer or a network of interacting computers. Examples of a user device include without limitation a laptop computer 121, a cell phone 122 and a smart phone 123. A user may communicate with other devices over the network 105 by using a user device 120. A user may be, for example, a consumer who is browsing or shopping in a marketplace on the Internet.

An advertiser 110 is an entity that is seeking to market a product and/or a service to users at the user devices 120. The one or more advertisers 110 include information technology infrastructure associated with companies like Target™, Gap™ and/or Macy's™, etc or their agents. In this example, an advertiser 110 may control without limitation an advertiser database 111, which preferably includes information about the advertiser's consumers.

The one or more ad networks 115 include information technology infrastructure associated with entities, such as Yahoo! Inc., and other ad networks, that distribute online ads (e.g., deliver ads to publisher's sites). In this example, an ad network 115 may control without limitation an ad network database 116. The ad networks (115) are configured for communicating with the one or more advertisers 110, with the one or more user devices 120, one or more third party data providers (125) and one or publishers (not shown).

Devices of the system 100 are configured with programs, algorithms, applications, software, graphical user interfaces, models, other tools and/or other procedures necessary to implement and/or facilitate methods and systems according to embodiments of the invention, or computerized aspects thereof, whether on one computer or distributed among multiple computers or devices. These include local and global adjustment, decision making, or optimizations, weighting, pricing, allocation, scheduling, serving, and/or other techniques. In various embodiments, the elements of the system 100 may exist on one computer, or may exist on multiple computers, devices and/or locations.

The ad network 115 may include, as part of the information technology infrastructure, an ad server computer (not shown) that may be directly incorporated in the ad network 115 or remotely coupled to the ad network 115 via the one or more networks 105. The ad server may alternatively be controlled by a separate entity, such as, for example, the third party data provider 125, which may control without limitation a third party database 126. The ad servers are configured for serving one or more ads to the user devices 120.

The configuration of the system 100 in FIG. 1 is for explanatory purposes. Other configurations that are not shown may be used without deviating from the spirit or scope of the invention. For example, in some embodiments, the ad networks 115 may be part of an ad exchange. For example, some Web portals operate, utilize, or facilitate advertising exchanges. Such exchanges may virtually connect parties including advertisers, publishers, networks of advertisers, networks of publishers, and other entities, including those entities' agents. The exchange may facilitate arrangements, bidding, auctioning in connection with ads and ad campaigns, and may also facilitate planning and serving of ads. Ads that may be included within the exchange may include display ads that are served in connection with published Web pages. The exchange may also include sponsored search ads, including ads served in association with user searches, such as keyword searches. Any type of simple or sophisticated ads may be included, such as text, graphic, picture, video and audio ads, streaming ads, interactive ads, rich media ads, etc.

In some embodiments, active ads are ads that are available for serving on or in connection with the exchange, whereas non-active ads are not so available. For example, non-active ads may include ads that are in review prior to be available for serving. This may include review as part of an editorial process to try to ensure or reduce the chance that inappropriate or dangerous ads are not allowed to be active. There are numerous other configurations in other embodiments that are possible.

Augmenting Data from Ad Networks with Data from Advertisers

A key to success in online marketing has been behavioral marketing, where consumer profiles are generated by merging online consumer data with offline consumer data. There is a wealth of consumer data with ad networks, such as shopping networks, comparison robots and other such entities (e.g., Yahoo!™ Shopping, eBates™, eBay™). An ad network has companies (e.g., Comcast™, Target™, Gap™, Macy's™, etc.) that advertise on the ad network. Each of these companies has their own customers (e.g., end users, consumers, etc.). The ad network can help the advertisers to aim ads based on consumer profile data that the ad network has.

However, consumer profile data from ad networks is relatively generic and typically does not help the advertiser (e.g., Comcast™) to make finer ad targeting decisions. While an ad network may have data that is relevant to an advertiser's customers, it is likely that each advertiser (e.g. Comcast™) has data that is substantially more relevant to the particular advertiser's customers. For example, an advertiser, such as Macy's™, would likely have better data to determine if its consumers would react to a "20% Off" offer versus a "Buy One Get One Free" offer. As another example, consider a scenario where Comcast™ wants to serve cable package ads on sports channels for their non-customers and to serve discounted upgrade package ads for existing customers. The system provided here is configured for helping an advertiser to target their customers with appropriate ads more accurately.

Figure 2:
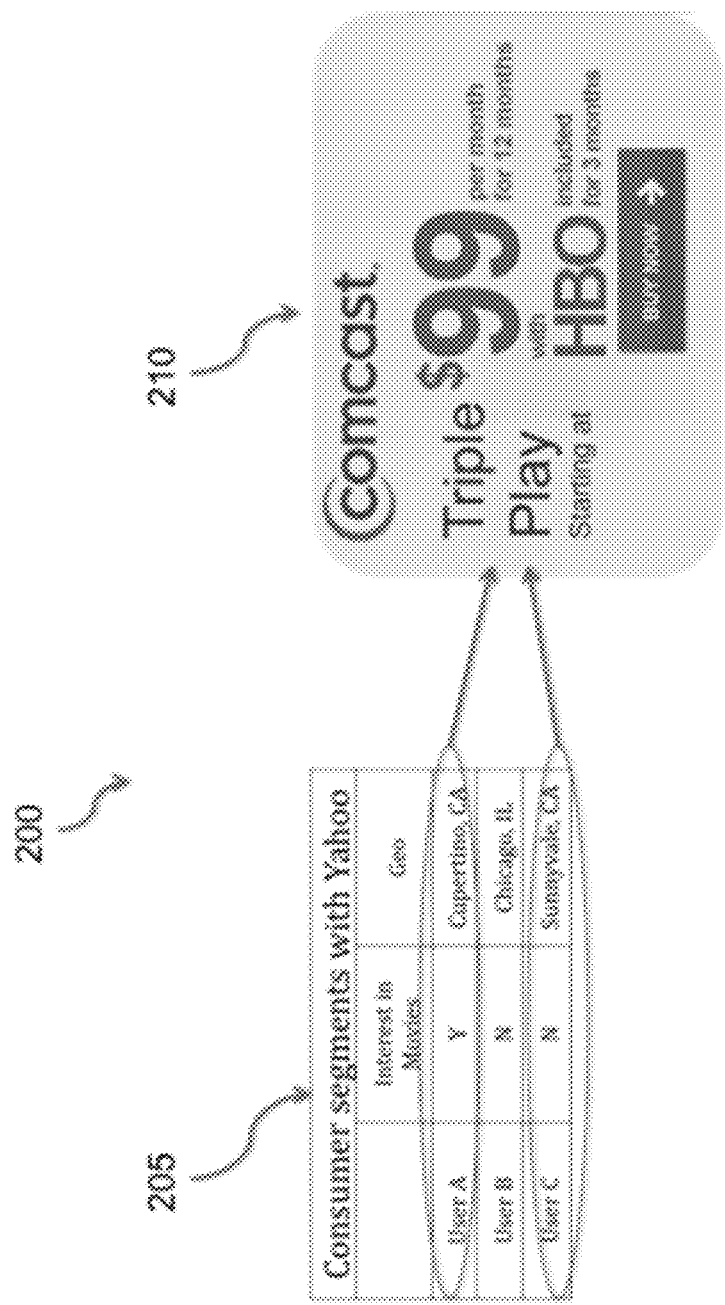
FIG. 2 illustrates ad targeting based on data from an ad network, in accordance with some embodiments.

FIG. 2 illustrates an ad targeting 200 based on data 205 from an ad network, in accordance with some embodiments. In this example, Comcast™ is running an ad 210 for the San Francisco Bay Area. The ad network (e.g., Yahoo!™) has data 205, including without limitation consumer segments. This example shows three user profiles for a User A, a User B and a User C. The categories of information include "Interest in Movies" and "Geo" (e.g., geographical location). Given these three consumer profiles, in one embodiment, ad targeting works as follows.

The ad targeting, in this example, is driven by data 205 from the ad network. Although an ad network may have a wealth of data, the data contains limited information about the consumer, and therefore it is not as focused as it could be. Considering the data that the ad network has with respect to a consumer who is also a customer of the advertiser (e.g., Comcast™), it is likely that the advertiser (e.g., Comcast™, Target™, Gap™, Macy's™, etc.) has more data that is relevant to the advertiser's consumers.

Figure 3:
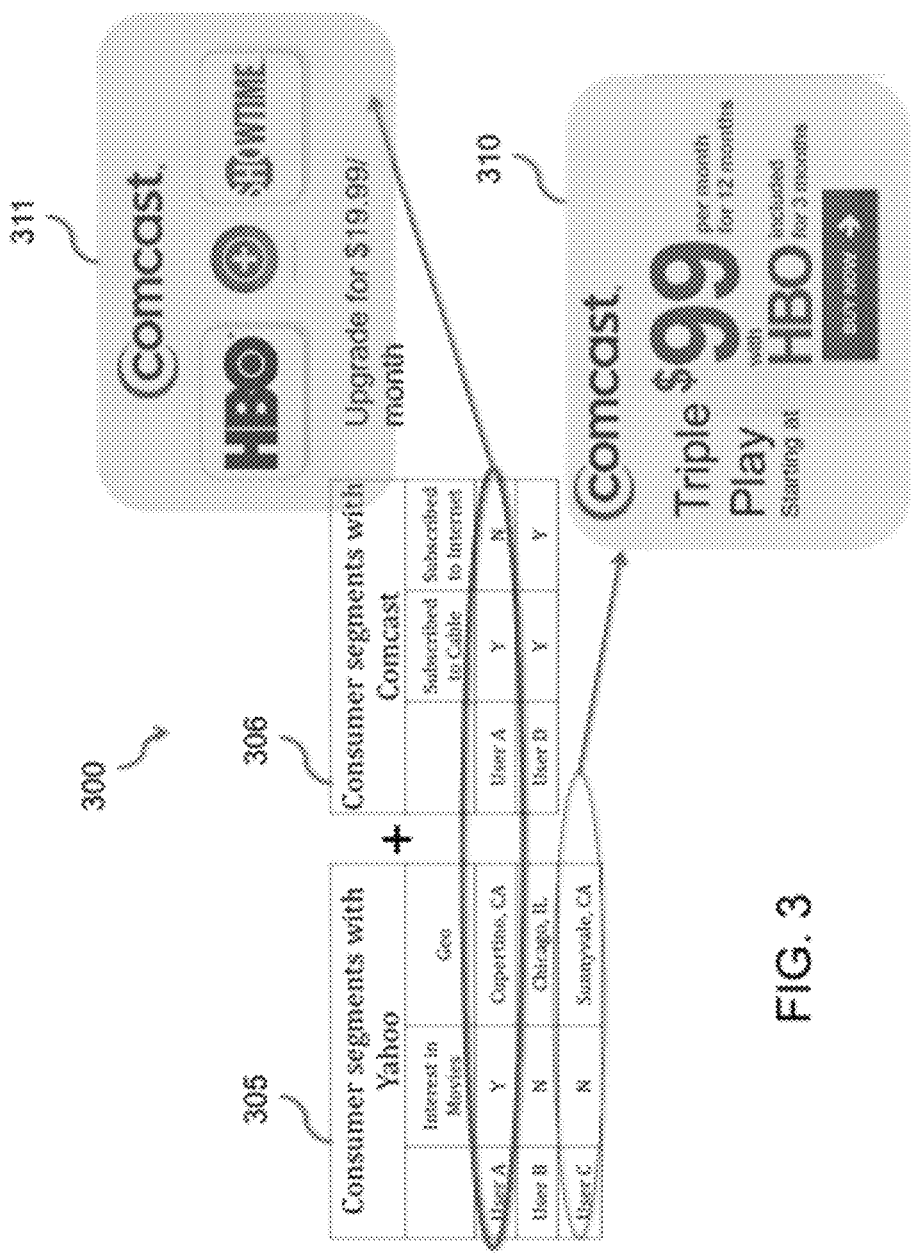
FIG. 3 illustrates ad targeting based on data from an ad network combined with data from an advertiser, in accordance with some embodiments.

FIG. 3 illustrates ad-targeting 300 based on data 305 from an ad network combined with data 306 from an advertiser, in accordance with some embodiments. If a consumer is already a Comcast customer, then certain ads (e.g., a Triple Play ad for a customer who is already signed up for Triple Play) may not be relevant for the advertised service. The present system provides a way to combine profile data 305 from an ad network with profile data 306 from the advertiser (e.g., Comcast™). In some embodiments, the ad targeting works as follows.

Combining the consumer data 305 from the ad-network and the consumer data 306 from the advertiser provides an ad campaign that is targeted much more accurately. However, the complexity of data sharing, complex ETL, data mapping and data Regulations makes such an effort difficult and not scalable. The description below provides a system that combines data in real-time without sharing proprietary data between the entities so as to overcome the complexities mentioned above.

FIG. 4 is a flow diagram of an existing method 400 for combining consumer data for targeted advertising. In a first step of the existing method 400, the ad network receives ad campaign information (e.g., budgets, criteria and creatives) from one or more advertisers 410. In a second step of the existing method 400, the ad network 415 gets data about the consumer from the consumer's browser 420. The ad network runs ad targeting and considers campaign information (e.g., budgets, criteria and creatives) to decide which advertiser gets the spot on the webpage displayed at the browser 420, and what ad (creative) gets the spot. Once the advertiser and appropriate campaign is decided, in a step 3 of the existing method 400, the appropriate ad is served to the browser 420 and/or pulled from an ad agency.

FIG. 5 is a high-level flow diagram of a proposed method 500 for combining consumer data for targeted advertising, in accordance with some embodiments. This proposed method 500 is a high-level illustration of how the present system is designed to improve upon the shortcomings of the existing method 400 of FIG. 4.

In a first step of the proposed method 500, the ad network 515 receives campaign information (e.g., budgets, criteria and creatives) from one or more advertisers 510. The ad network 515 may sometimes be referred to as an inside entity that is configured for managing at least part of the ad serving procedures. In a second step of the proposed method 500, the ad network 515 receives, from a user device such as a browser 520, a notification about an available ad spot on a webpage. The ad network 515 may also receive data about a consumer. The proposed method 500 differs from the existing method of FIG. 4 after the second step.

In a third step of the proposed method 500, the ad network 515 serves an ad template to the browser 520 on behalf of the selected advertiser, instead of directly serving an ad. The advertiser 510, and any entity other than the ad network 515, may sometimes be referred to as an outside entity that is configured for managing at least part of the ad serving procedures. The ad template includes a script configured for forcing an interaction with the selected advertiser 510. In a fourth step of the proposed method 500, the advertiser may consider the consumer's profile available with the advertiser in order to influence or to dictate the appropriate ad (e.g., creative) to serve. In a fifth step of the proposed method 500, the advertiser provides instructions pertaining to serving the appropriate ad to the browser 520 running at the user device.

Note that the method 500 may include other details and steps that are not discussed in this method overview. Other details and steps are discussed with reference to the appropriate figures and may be a part of the method 500, depending on the embodiment.

Figure 6:
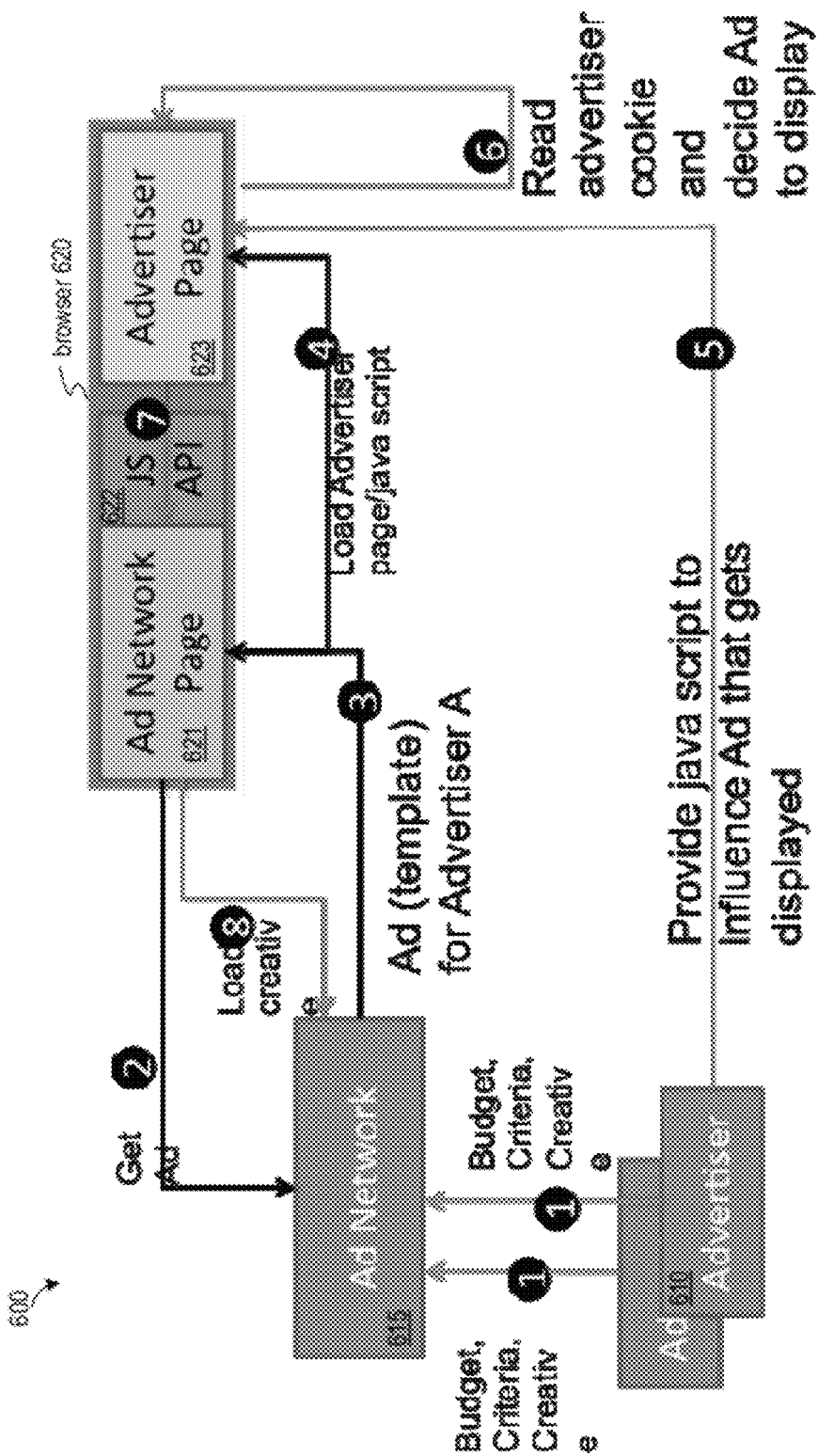
FIG. 6 is a more detailed flow diagram of a method for combining consumer data for targeted advertising, in accordance with some embodiments.

FIG. 6 is a more detailed flow diagram of a method 600 for combining consumer data for targeted advertising, in accordance with some embodiments. In some embodiments, the method 600 is a more detailed illustration of the method 500 of FIG. 5.

In a first step of the method 600, the ad network 815 receives ad campaign information (e.g., budgets, criteria and creatives) from one or more advertisers 610. In a second step of the method 600, the ad network 615 receives consumer data from a browser 620. In a third step of the method 600, the ad network 615 sends an ad template to the browser 620 on behalf of a particular advertiser (e.g., Advertiser A), instead of directly serving an ad. The ad network 615 selects an appropriate advertiser by analyzing ad campaign information (e.g., budgets, criteria and creatives) in light of consumer data received about the browser 620. The ad template is configured for forcing an interaction with the selected advertiser 610 (e.g., Advertiser A).

One way to implement this method 600 is to use a bridge 622 (e.g., script) that facilitates communication between the advertiser 610 and the ad network 615. In this example, the bridge includes a JavaScript™ application program interface (JS API) 622. The bridge allows the advertiser 610 to influence the ad that gets displayed at the browser 620. The system divides the ad spot into at least two parts, including the ad network page 621 and the advertiser page 623. Initially, the advertiser page 623 is substantially blank because the advertiser is unknown before the ad network 615 selects the advertiser that will advertise at the particular ad spot. The ad network page 621 initiates a call to the ad network 615 to get an ad.

In a fourth step of the method 600, the ad network 615 may send a response that includes a Uniform Resource Locator (URL) that provides a link to the advertiser page 623. The advertiser page 623 may, for example, be embedded into a webpage that is substantially blank. Next, in a fifth step of the method 600, the advertiser page loads a script provided by the advertiser 610. For example, the script may include a JavaScript™ in a hidden frame of the advertiser page 623. The script provided in the fifth step is configured for communicating with the bridge 622 and for influencing the ad targeting (e.g., ad selection) of the ad that is to be displayed at the browser 620.

In a sixth step of the method 600, the script from the advertiser 610 reads advertiser-specific cookies and makes decisions based on cookie availability and cookie value. In a seventh step of the method 600, the bridge 622 sends instructions back to the ad network page 621 to influence ad targeting (e.g., ad selection). In an eighth step of the method 600, the ad network page 621 sends instructions to the ad network 615 about the appropriate ad (creative) to send to the browser 620 for display.

Note that the method 600 may include other details and steps that are not discussed in this method overview. Other details and steps are discussed with reference to the appropriate figures and may be a part of the method 600, depending on the embodiment.

FIG. 7 is an example of a script 700 that an Advertiser may implement to influence a decision pertaining to an ad displayed at an ad spot, in accordance with some embodiments. In this example, the script 700 includes a JavaScript™. The script 700 is an example of the JavaScript™ that the advertiser 610 of FIG. 6 may send to the browser 620. In the script 700 of FIG. 7, the function "tellMeWhatAdToServe" is a callback that the advertiser implements by using their own logic. The function is configured for reading an advertiser cookie and selecting an ad based on the value of the advertiser cookie.

An advertiser, who has an online presence, can manage their data using internal methods and models (e.g., scoring models). The advertiser may utilize that data to place a specific cookie to categorize their consumers as they browse through advertiser's website(s). For example, a cookie value "a" may be designated for middle aged men. A cookie value "b" may be designated for female students, and so on. To take an active role in the system, the advertiser hosts an advertiser page. For example, in FIG. 6, the advertiser page 623 includes a JavaScript™ page from the advertiser 610.

Figure 8:
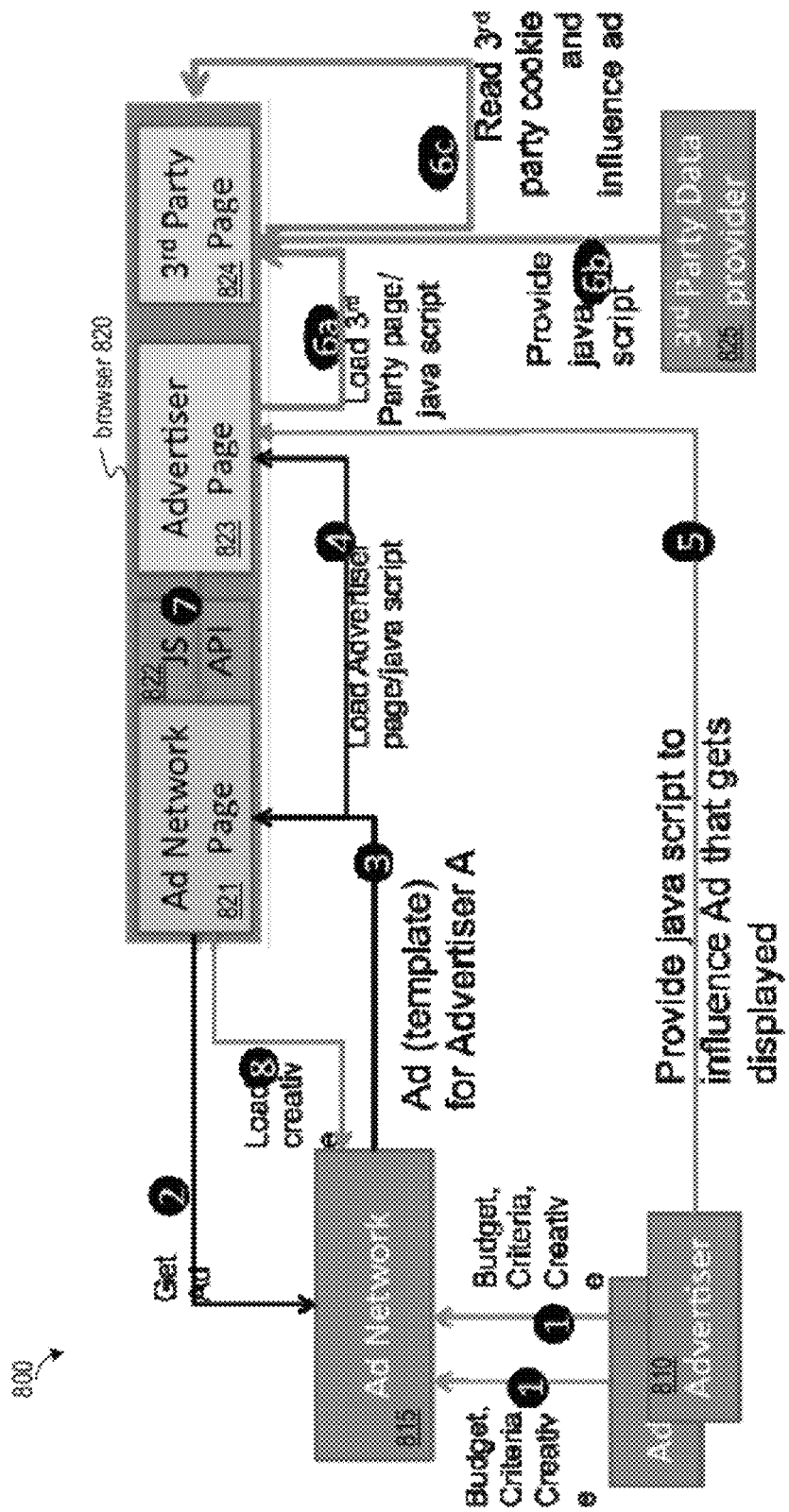
FIG. 8 is another more detailed flow diagram of a method for combining consumer data for targeted advertising, in accordance with some embodiments.

FIG. 8 is another more detailed flow diagram of a method 800 for combining consumer data with ad network data for targeted advertising, in accordance with some embodiments. In some embodiments, the method 800 is a more detailed illustration of the method 500 of FIG. 5. The method 800 of FIG. 8 is similar to the method 600 of FIG. 6, but with added functionality related to a third party data provider 825. The third party data provider 825, and any entity other than the ad network 815, may sometimes be referred to as an outside entity that is configured for managing at least part of the ad serving procedures.

In a first step of the method 800, the ad network 815 receives ad campaign information (e.g., budgets, criteria and creatives) from one or more advertisers 810. In a second step of the method 800, the ad network 815 receives consumer data from a browser 820. In a third step of the method 800, the ad network 815 serves an ad template to the browser 820 on behalf of a particular advertiser (e.g., Advertiser A), instead of directly serving an ad. As explained above, the ad network 815 selects the appropriate advertiser by analyzing ad campaign information (e.g., budgets, criteria and creatives) in light of consumer data received about the browser 820. The ad template is configured for forcing an interaction with the selected advertiser 810 (e.g., Advertiser A).

One way to implement this method 800 is to use a bridge 822 that facilitates communication between the advertiser 810 and the ad network 815. In this example, the bridge includes a JavaScript™ application program interface (JS API) 822. The bridge allows the advertiser 810 to influence the ad that gets displayed at the browser 820. The system divides the ad spot into at least two parts, including the ad network page 821 and the advertiser page 823. Initially, the advertiser page 823 is blank because advertiser is unknown before the ad network 815 selects the advertiser that will advertise at the particular ad spot. The ad network page 821 initiates a call to the ad network 815 to get an ad.

In a fourth step of the method 800, the ad network 815 may send a response that includes a Uniform Resource Locator (URL) that provides a link to the advertiser page 823. The advertiser page 823 may, for example, be embedded into a blank webpage. Next, in a fifth step of the method 800, the advertiser page loads a script provided by the advertiser 810. For example, the script may include a JavaScript™ in a hidden frame of the advertiser page 823. The script provided in the fifth step is configured for communicating with the bridge 822 and for influencing the targeting (e.g., selection) of the ad that is to be displayed at the browser 820.

The method 800 differs from the method 600 of FIG. 6 at a sixth step. The advertiser 810 may not have an online presence, or otherwise may not be managing the advertiser page 823 for whatever reason. The advertiser 810 may partner with third party data provider 825 who has an online presence and who has already seeded their clients (e.g., the advertiser 810) with means scoring cookies. For example, examples of a third party data provider 825 may include a comparison shopping websites, cash back programs provided by Bing™, etc.

Accordingly, in a step 6a of the method 800 of FIG. 8, the script provided by the advertiser 810 instructs the browser 820 to load a third party web page, including a third party script (e.g., a JavaScript™). The third party data provider 825 collaborates with the advertiser 810 in regards to ad management. In a step 6b, the third party data provider 825 sends a script (e.g., a JavaScript™) configured for influencing ad targeting (e.g., selection). The method 800 can be extended to include any number of 3rd party providers to combine data at run time.

In a seventh step of the method 800, the bridge 822 sends instructions back to the ad network page 821 to influence ad targeting (e.g., ad selection). In an eighth step of the method 800, the ad network page 821 sends instructions to the ad network 815 about the appropriate ad (creative) to send to the browser 820 for display.

Note that the method 800 may include other details and steps that are not discussed in this method overview. Other details and steps are discussed with reference to the appropriate figures and may be a part of the method 800, depending on the embodiment.

Generally, in the embodiments described above, the advertiser and the ad network do not share proprietary data related to their customers. There is also no complex extracting, transforming or loading (ETL). The ad network is not sharing consumer profiles or data with the advertiser. The ad network is reading their own data (e.g., via cookies) and using their data to pick an advertiser. The ad network is sending, to the advertiser, ad campaign details (e.g., ad campaign identifier) and optionally an available content list for the ad campaign. Likewise, the ad network is not sharing consumer profiles or data with the advertiser. The ad network is reading their own data (e.g., via cookies) and using the data to select advertisers. The advertiser is then using their own data (e.g., cookies) to identify consumers and to play an active role in deciding which ad content to serve to the browser. Ideally, only the advertiser can properly interpret the advertiser's cookie.

The entities (e.g., advertisers and ad networks) may keep their proprietary data private and may avoid legal issues that are associated with compromising privacy of consumers. The advertiser is neither hosting nor serving an ad. Instead, the advertiser is hosting a tiny script (e.g., JavaScript™) to read the advertiser's own cookies and to influence which content gets served to the browser.

Regarding latency in serving ads, a script (e.g., JavaScript™) that an Advertiser is going to host is likely to be only a few lines (e.g., read cookie->interpret cookie->return content selection to ad-network). The script may cost an extra domain name server (DNS) lookup on the consumer side (e.g., to resolve comcast.com) and any time it takes to load and run the script (e.g., tiny JavaScript™). In some embodiments, this additional latency is likely to be between about 50 and 200 milliseconds.

Not all embodiments described above are ideal for every advertiser. For example, the method 800 of FIG. 8 is suitable for advertisers who have an online presence and have considerable data. An example of such an advertiser is Walmart™. To run smoothly, the advertiser needs to work internally with its information technology (IT) department, or with a third party data provider (e.g., Amazon.com) that runs ad scoring models and clean cookies from their pages.

The method is not only for advertisers. The particular entities in the figures are provided for explanatory purposes. Other entities and arrangements are possible. For example, the method may be applied between an ad-network and an advertiser, between an ad-network and another ad-network, between an ad-network and an advertiser's partner, and so on. For instance, Yahoo!™ Shopping (or Bing™ Shopping or Ebates.com) may run an ad for Walmart™ by working with an ad network to make use of data from each entity.

The method is different from other methods that require an advertiser to outsource data and work closely with the outside entity. In contrast, the methods described herein put advertisers in the front seat and allows the advertiser to make use of data that the advertiser owns without sharing the data. The methods are preferably carried out in real-time with ad networks, advertisers and/or third party data partners. The method allows an ad network, with the help of an advertiser, to deliver a finely targeted ad that has a click-through rate (CTR) that is higher than a CTR of an ad that does not use the method.

Exemplary Network, Client, Server and Computer Environments

FIG. 9 is a diagrammatic representation of a network 900, including nodes for client systems 902₁ through 902_N, nodes for server systems 904₁ through 904_N, nodes for network infrastructure 906₁ through 906_N, any of which nodes may comprise a machine 950 within which a set of instructions, for causing the machine to perform any one of the techniques discussed above, may be executed. The embodiment shown is exemplary, and may be implemented in the context of one or more of the Figures herein.

Any node of the network 900 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a Web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems, a massively parallel computer system, and/or a cloud computer system.

The computer system 950 includes a processor 908 (e.g., a processor core, a microprocessor, a computing device, etc.), a main memory 910 and a static memory 912, which communicate with each other via a bus 914. The machine 950 may further include a display unit 916 that may comprise a touch-screen, or a liquid crystal display (LCD), or a light emitting diode (LED) display, or a cathode ray tube (CRT). As shown, the computer system 950 also includes a human input/output (I/O) device 918 (e.g. a keyboard, an alphanumeric keypad, etc), a pointing device 920 (e.g., a mouse, a touch screen, etc), a drive unit 922 (e.g., a disk drive unit, a CD/DVD drive, a tangible computer readable removable media drive, an SSD storage device, etc.), a signal generation device 928 (e.g., a speaker, an audio output, etc.), and a network interface device 930 (e.g., an Ethernet interface, a wired network interface, a wireless network interface, a propagated signal interface, etc.).

The drive unit 922 includes a machine-readable medium 924 on which is stored a set of instructions 926 (e.g., software, firmware, middleware, etc.) embodying any one, or all, of the methodologies described above. The set of instructions 926 is also shown to reside, completely or at least partially, within the main memory 910 and/or within the processor 908. The set of instructions 926 may further be transmitted or received via the network interface device 930 over the network bus 914.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; electrical, optical or acoustical or any other type of media suitable for storing information.

Advantages

Embodiments of the system are configured for blending advertiser data with ad network data in order to server finely targeted ads. Advantageously, there is no transfer of proprietary data between the advertiser and the ad network. The entities (e.g., advertisers and ad networks) may keep their proprietary data private and may avoid legal issues that are associated with compromising privacy of consumers. The additional latency involved with carrying out the method is negligible. The method may be arranged between advertisers and ad networks, but also between other entities, such as between an ad network and another ad network. The method allows a company like Yahoo!™ to help their clients do highly productive marketing and to be a leader in smart display ads technology. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for delivering targeted advertisements, the method comprising:
    receiving, by a computer of an advertisement network, and from a browser of a user device, a notification of an available advertisement spot on a webpage at which to display an advertisement by the browser;
    dividing, by a computer of an advertisement network, the available advertisement spot into an ad network page and a second page;
    providing, by a computer of the advertisement network, to the browser, a bridge comprising a first script configured to facilitate communication between the ad network page and the second page;
    receiving, by a computer of the advertisement network, consumer data from the ad network page;
    providing, by a computer of the advertisement network, to the browser, and in response to the consumer data received from the ad network page, an advertisement template, the advertisement template configured to force an interaction between the browser and an advertiser device of a particular advertiser by providing to the second page a link configured to cause the browser to load a second script from the advertiser device;
    receiving, by a computer of the advertisement network, via the bridge, and as a result of the browser loading the second script, data configured to influence an advertisement selection; and
    selecting, by a computer of the advertisement network, an advertisement for delivery and display at the available advertisement spot on the webpage, where the selection of the advertisement is based on the received data configured to influence selection of an advertisement.

2. The method of claim 1, wherein the data configured to influence selection of an advertisement is based on the second script reading advertiser cookie data associated with the advertiser.

3. The method of claim 2, wherein the bridge receives the result of the second script from the second page, and in response the ad network page sends, to a computer of the advertisement network, an instruction to send an advertisement consistent with the advertisement selected by the second script.

4. The method of claim 1, wherein the bridge is configured to receive, from one of the advertisement network or the advertiser device, data selected from the group consisting of:
    specific cookies;
    cookie availability; and
    cookie value.

5. The method of claim 1, wherein the bridge is further configured to send instructions back to the advertisement network, the advertiser device, or both the advertisement network and the advertiser device.

6. The method of claim 1, wherein: the second script is configured to instruct the browser to load a third party script from a third-party device.

7. The method of claim 1, wherein:
    the advertisement network and the advertiser device do not share data,
    the receiving of the consumer data from the browser comprises a computer of the advertisement network reading an advertisement network cookie of the browser, and
    the data configured to influence selection of an advertisement is a result of the second script reading an advertiser cookie of the browser, the advertiser cookie associated with the advertiser.

8. The method of claim 1, wherein providing the advertising template comprises analyzing, by a computer of the advertisement network, the consumer data received from the browser in light of advertisement campaign information received from the advertising device.

9. A system for delivering targeted advertisements, the system comprising:
    a computer system configured to:
        receive, from a browser of a user device, a notification of an available advertisement spot on a webpage at which to display an advertisement by the browser;
        divide the available advertisement spot into an ad network page and a second page;

provide, to the browser, a bridge comprising a first script configured to facilitate communication between the ad network page and the second page;

receive consumer data from the ad network page;

provide, to the browser, in response to the consumer data received from the an advertisement template, the advertisement template configured to force an interaction between the browser and an advertiser device of a particular advertiser by providing to the second page a link configured to cause the browser to load a second script from the advertiser device;

receive, via the bridge, and as a result of the browser loading the second script, data configured to influence an advertisement selection; and select an advertisement for display at the available advertisement spot on the web page, where the selection of the advertisement is based on the received data configured to influence selection of an advertisement.

10. The system of claim 9, wherein the data configured to influence selection of an advertisement is based on the second script reading advertiser cookie data associated with the advertiser.

11. The system of claim 10, wherein the bridge is configured to receive the result of the second script, and the ad network page is configured to in response send, to the computer system, an instruction to send an advertisement consistent with the advertisement selected by the second script.

12. The system of claim 9, wherein the bridge is configured to receive, from one of the computer system or the advertiser device, data selected from the group consisting of:
specific cookies;
cookie availability; and
cookie value.

13. The system of claim 9, wherein the bridge is further configured to send instructions back to the computer system, the advertiser device, or both the computer system and the advertiser device.

14. The system of claim 9, wherein the
second script is configured to instruct the browser to load a third party script from a third-party device.

15. The system of claim 9, wherein:
the computer system and the advertiser device are configured to not share data,
the computer system is configured to receive the consumer data from the browser by reading an advertisement network cookie of the browser, and
the data configured to influence selection of an advertisement is a result of the second script reading an advertiser cookie of the browser, the advertiser cookie associated with the advertiser.

16. A non-transitory computer readable medium comprising one or more instructions for delivering targeted advertisements, wherein the one or more instructions are configured for causing one or more processors to perform acts of:

receiving, from a browser of a user device, a notification of an available advertisement spot on a webpage at which to display an advertisement by the browser;

dividing the available advertisement spot into an ad network page and a second page;

providing, to the browser, a bridge comprising a first script configured to facilitate communication between the ad network page and the second page;

receiving consumer data from the ad network page;

providing, to the browser, in response to the consumer data received from the ad network page, an advertisement template, the advertisement template configured to force an interaction between the browser and an advertiser device of a particular advertiser by providing to the second page a link configured to cause the browser to load a second script from the advertiser device;

receiving, via the bridge, and as a result of the browser loading the second script, data configured to influence an advertisement selection; and selecting an advertisement for delivery and display at the available advertisement spot on the webpage, where the selection of the advertisement is based on the received data configured to influence selection of an advertisement.

17. The non-transitory computer-readable medium of claim 16, wherein the data configured to influence selection of an advertisement is based on the second script reading advertiser cookie data associated with the advertiser.

18. The non-transitory computer-readable medium of claim 17, wherein the bridge is configured to receive the result of the second script, and the ad network page is configured to in response send, to the computer system, an instruction to send an advertisement consistent with the advertisement selected by the second script.

19. The non-transitory computer-readable medium of claim 16, wherein the second script is configured to instruct the browser to load a third party script from a third-party device.

20. The non-transitory computer-readable medium of claim 16, wherein:
the one or more processors and the advertiser device are configured to not share data,
the one or more processors are configured to receive the consumer data from the browser by reading an advertisement network cookie of the browser, and
the data configured to influence selection of an advertisement is a result of the second script reading an advertiser cookie of the browser, the advertiser cookie associated with the advertiser.

* * * * *